Figure 1:
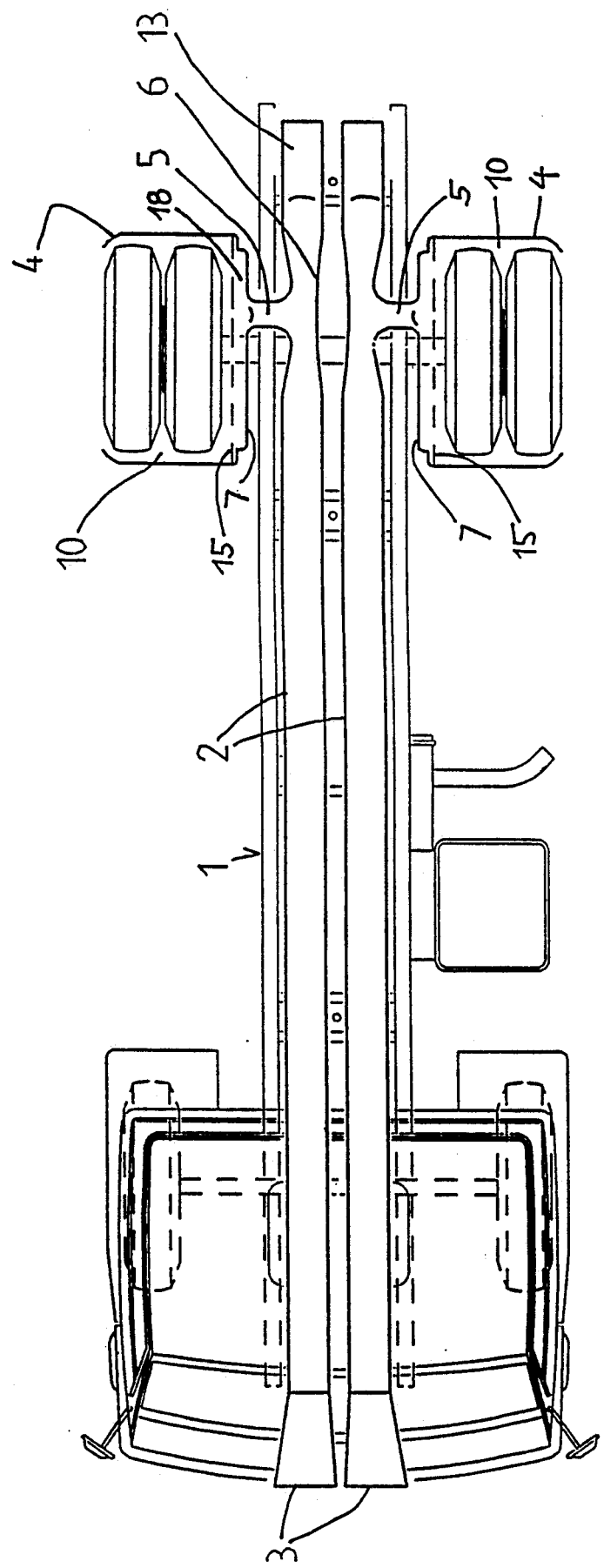

United States Patent [19]
Schmidt

[11] Patent Number: 5,299,831
[45] Date of Patent: Apr. 5, 1994

[54] DEVICE FOR REDUCING ROAD SPRAY FROM MOTOR VEHICLE WHEELS

[76] Inventor: Alfred Schmidt, Dorf 35, D-8130 Bernau, Fed. Rep. of Germany

[21] Appl. No.: 773,638
[22] PCT Filed: Mar. 12, 1991
[86] PCT No.: PCT/EP91/00461
 § 371 Date: Jan. 11, 1992
 § 102(e) Date: Jan. 11, 1992
[87] PCT Pub. No.: WO91/13792
 PCT Pub. Date: Sep. 19, 1991

[30] Foreign Application Priority Data
Dec. 3, 1990 [DE] Fed. Rep. of Germany ....... 4007771

[51] Int. Cl.⁵ .............................................. B62D 25/16
[52] U.S. Cl. .................................................... 280/851
[58] Field of Search ................ 280/851, 852, 853, 847

[56] References Cited
U.S. PATENT DOCUMENTS

| | | | |
|---|---|---|---|
| 4,290,619 | 9/1981 | Goodall | 280/851 |
| 4,436,319 | 3/1984 | Clutter | 280/851 |
| 4,445,700 | 5/1984 | Schroeder | 280/851 |
| 4,706,981 | 11/1987 | Dorwart | 280/851 |

FOREIGN PATENT DOCUMENTS

| | | |
|---|---|---|
| 500213 | 6/1930 | Fed. Rep. of Germany . |
| 396797 | 4/1909 | France . |
| 59-192675 | 11/1984 | Japan . |
| 104454 | 4/1924 | Switzerland . |
| 2191160 | 12/1987 | United Kingdom . |

Primary Examiner—Margaret A. Focarino
Assistant Examiner—Michael Mar

[57] ABSTRACT

An apparatus for suppression of spray-mist escaping from the wheel area of vehicles having laterally spaced wheels comprises an exhaust suction apparatus located on each side of the vehicle, each suction apparatus has a fender surrounding a respective one of the laterally spaced wheels, the fender having a circumferential upper portion and a suction hood formed on an inner portion of the fender, an inner wall having a plurality of suction intake openings is located within the fender and laterally spaced from the suction hood, a suction tube is connected at one end to an outlet formed in the suction hood and at an opposite end to an exhaust conduit, the exhaust conduit has an exhaust outlet located at a rear end of the vehicle, and apparatus for creating a suction force in the suction tube for directing spray-mist from the fender to the exhaust outlet.

6 Claims, 4 Drawing Sheets

DEVICE FOR REDUCING ROAD SPRAY FROM MOTOR VEHICLE WHEELS

DESCRIPTION

The invention is comprised of an apparatus for containment of spray-fog expulsion from the wheel area of automobiles, in particular of commercial trucks, with an exhaust device creating underpressure in the wheel space of the respective fender, which via an exhaust suction pipe and via exhaust suction openings, is connected to the wheel space of at least one fender.

Experts of the area have long since recognized the need to take measures in the surpression of the spray-misting occurences, to improve traffic safety in passing situations. At issue here, is to prevent the small water particles, which are swirled up by the automobile tires on a wet street, from expanding as spray-misting fog in the airstream of the vehicle. Especially dangerous to the trailing traffic hereby is, the expansion of spray-mist fog particles in a sideward direction, where it leads to a considerable vision impairment.

Partial solutions are already available, which will either, via extensive enclosure of the spray-mist fog producing wheel, or a suitable design, in particular of the inside section of the fenders, facilitate the collection of at least part of the spray-mist fog particles, which are impairing the vision of the trailing vehicles. There the spray-fog water is expelled to catching surfaces, collected and channeled back to the ground again, mostly along the inside of the fender. However, such devices cannot prevent the sidewards expansion of the spray-fog. Aside from the vision impairment connected with this, another adverseness develops, which has thusfar not been sufficiently acknowledged; in that on wintery roads with the spraying of plantage along the roadside, considerable contact damage occurs, because the spray-fog droplets contain a high amount of salt components, due to the application of thawing salts onto the traffic lanes. The growth damage caused by this distribution of salt containing spray-fog droplets can also extend to forests, far removed from the road edge.

A known apparatus (JP-A-59 192 675) entails an exhaust suction apparatus, positioned behind the wheel for suppression of the escape of dust and dirt from the wheel area. While this apparatus improves the conventional dirt catching devices, overall it is however without effect in the exhaust suctioning of the spray-fog, because it cannot prevent the sidewards escape of the spray-fog droplets which are whirled up in the airstream.

It thus follows, that the presented invention has as its basic task, to provide an apparatus for the suppression of spray-fog, which is more effective than the known solution suggestions, and which allows a particularily simple overall systems application for all the fenders of a vehicle.

Accordingly, this invention solves the task by positioning the exhaust intake openings, to which the exhaust tube is connected, at least on one inner wall, sectioning the fender from-and facing the vehicle center.

Although this solution requires a certain profusion of conduits, also occassionally for a blower system, nevertheless because of the considerably marked improved effectiveness it is advantageous, compared to the known apparatuses. Since the application is mainly intended for trucks and buses, therefore in the commercial sector, it is also economically justifiable. Furthermore, these additional provisions are withing reasonable bounds, especially when the necessary installations are completed at the time of assembly of the utility vehicles, and when easily installed and inexpensive tubes made of plastics or rubber-like materials are used for conduits.

In one preferable design model or the invention, the underpressure is created by a hydrolically, pneumatically or electrically powered suction fan system, for practical purposes placed in the rear area of the vehicle.

One particularily preferable design model, manages invention accordingly without a suction fan system, in as much as the suction effect is achieved with the Venturi-principal. With this, the exhaust suction system entails an exhaust suction conduit which exhibits an air intake hood, opening to the front side of the vehicle, and a constriction connected with the exhaust suction origin point. Hereby it is sensible to provide for a separate exhaust pipe for each side of the vehicle, which is for practical purposes installed along the longtitudenal girders, either between the longtitudenal girders of the vehicle chassis, or between the fenders and the vehicle chassis.

As regards the connection of the exhaust apparatus to the fender i.e. to the wheel space, as according with the invention, numerous variations are conceivable.

Within the parameter of the invention, individual exhaust suction systems, which are appropriated respectively to one wheel i.e. fender, could be possible. However also conceivable, is a combining to one exhaust apparatus on each side of the truck, where again both sides could be connected to an individual suction origin point, or could be connected with each other, with a common suction origin point. A particularily complete and constructive solution could possibly be, one to install suction channels on both sides of the truck chassis over its entire length, in which the wheel boxes are integrated, so that separate fenders will be inapplicable.

In the following, the invention will be explained by means of examples. Shown is FIG. 1 a top view of a commercial truck with an exhaust suction apparatus according with the Venturi-principal, FIG. 2 a top view of a commercial truck with a suction fan system as its exhaust suction apparatus, FIG. 3 a side view of the commercial truck, as in FIG. 2, and FIG. 4 a top view of a variation to FIG. 2.

Figure 2:
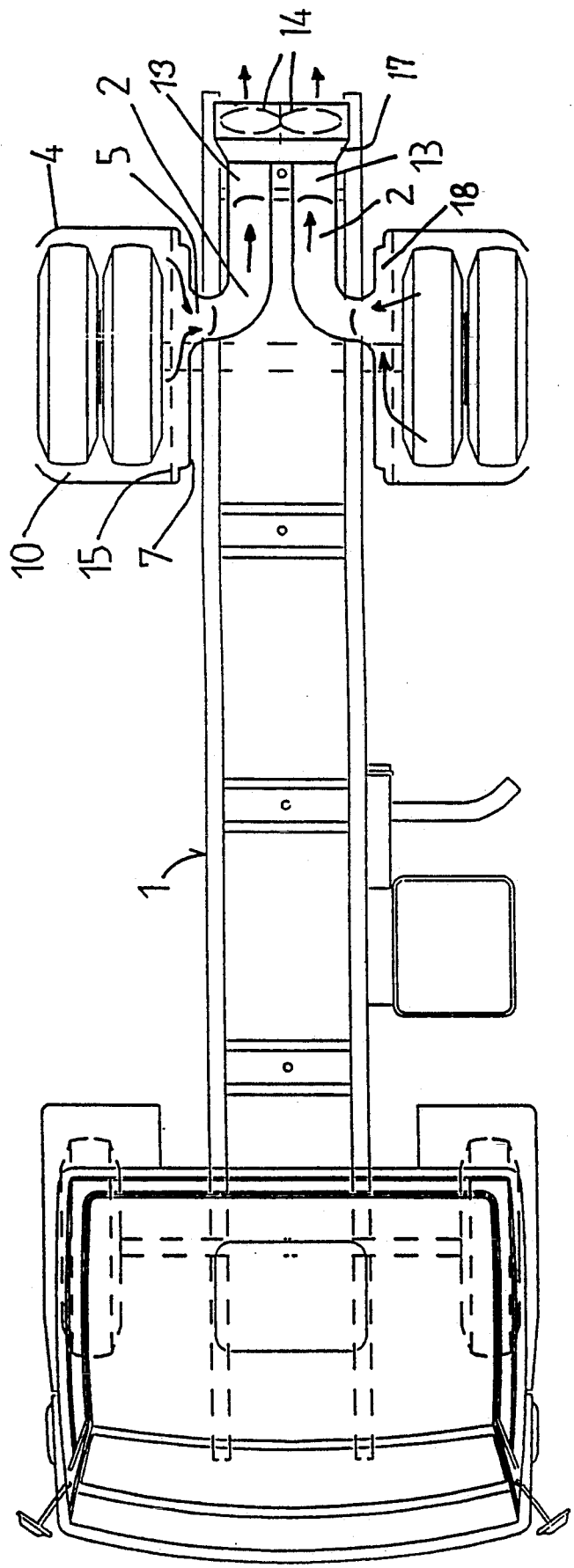

The schematically represented commercial truck chassis 1, in the top view FIG. 1, shows an exhaust suction apparatus in accordance with the Venturi-principal, while the FIG. 2 is showing an exhaust suction apparatus with a suction fan system. With all exhaust suction apparatuses, each respectively is provided with an axial connection of the exhaust suction tube on the area of the wall of the fender which faces to the center of the vehicle. In the variation according to FIG. 4, an additional radial suction exhaust of the wheel space, as it is enclosed by the fender, is realized. The expert will, according to space availability or other circumstances, choose either one or the other exhaust suction apparatus.

In the exhaust suction apparatus of FIG. 1, which functions in accordance to the Venturi-principal, an exhaust conduit 2, is provided which extends itself over the entire length of the vehicle. On the front side of the vehicle the exhaust conduit 2, exhibits an intake hood opening 3; in the parameter of the exhaust suction pipe 5, as it connects to the fender 4, the exhaust conduit 2, exhibits a constriction 6, for the creation of the underpressure in the exhaust pipe 5, and the thereto connected suction hood 7. The exhaust conduit 2, ends in its rear section in a downward bent air exhaust exit channel 13, in an open cross-section exit.

Figure 3:
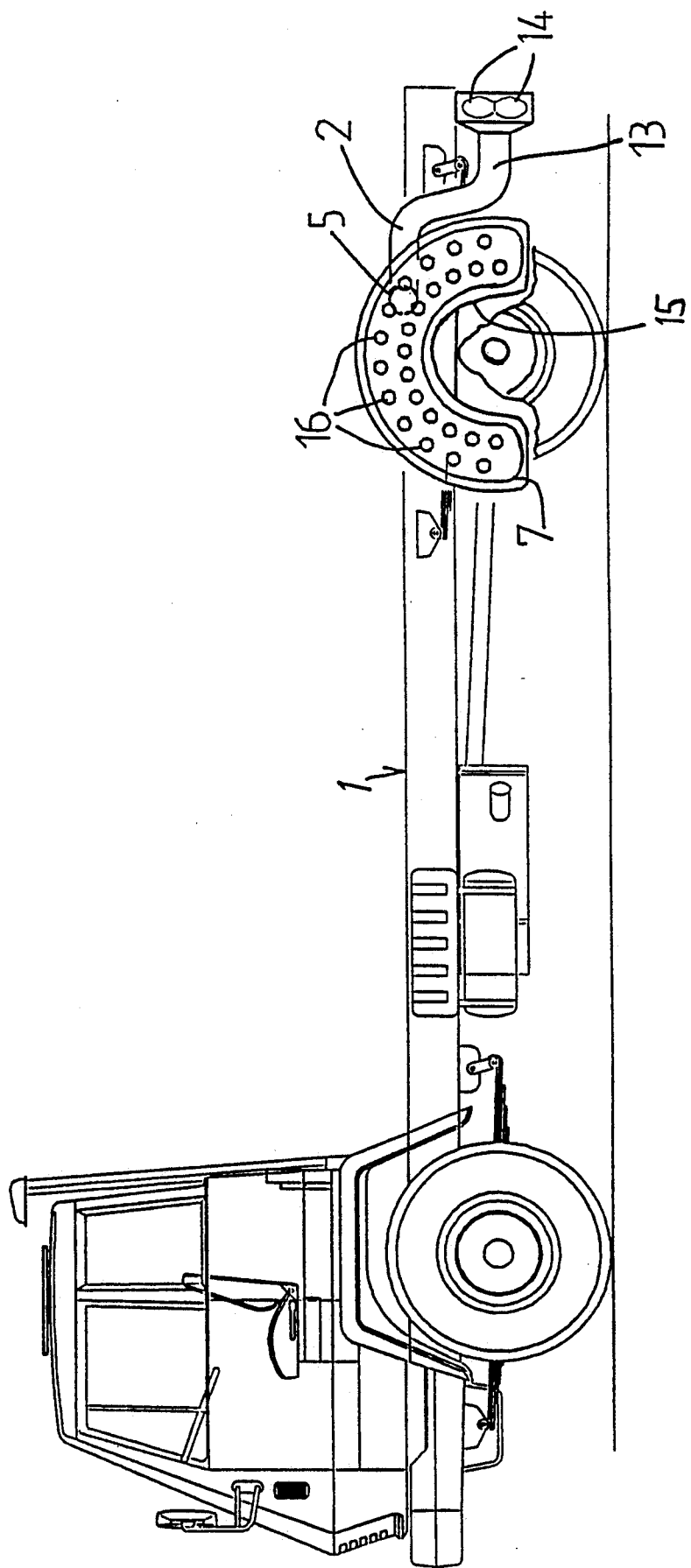

According with FIG. 1, the inner wall 15, facing towards the vehicle, of the fender 4, exhibits a flatly constructed suction hood 7, which as is shown in FIG. 3, exhibits an arch shape. In the parameter of the suction hood 7, the inner wall 15, is perforated, where the holes 16, as shown in FIG. 3, can exhibit a relatively large diameter. Because of the suction created within the suction hood 7, and therefore also in the wheel space 10, of the fender 4, the spray-fog which is created in the wheel space, can be efficiently sucked away, as this occurs right at the place of its creation.

Figure 4:
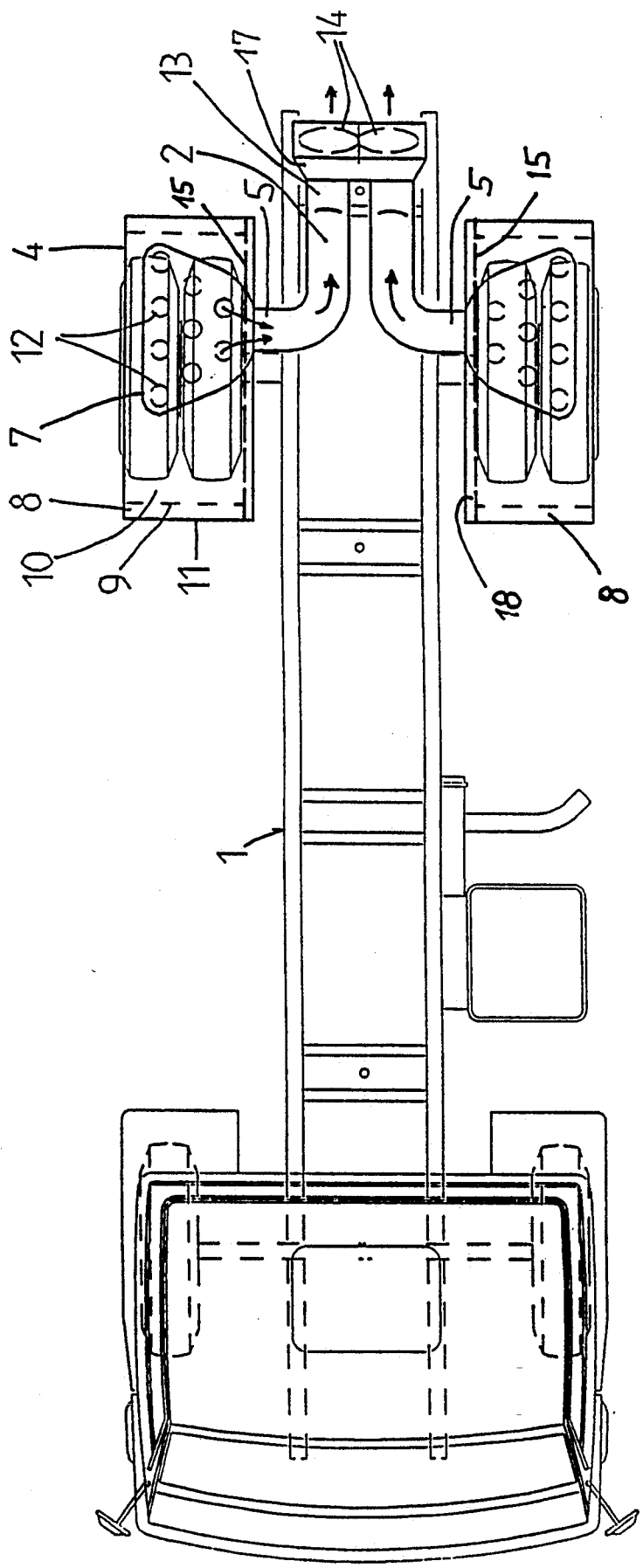

According to FIG. 4, the suction hood 7, is connected to a fender 4, which exhibits a circumference section, shown as the hollow section 8. The inner surface 9, of the hollow section 8, is perforated towards the wheel space 10; the outer surface 11, of the hollow section 8, exhibits several openings 12, in the parameter of the suction hood 7.

According to FIG. 2 through 4, each respectively is equipped with an exhaust apparatus with a blower system 14, in the exhaust exit channel 13. The exhaust conduit 2, is only very short; it reaches as is shown in FIG. 3, to the downward bent exhaust channel 13. The exhaust conduit 2, is connected to the perforated inner wall 15, of the fender 4, via an equally short exhaust tube 5, and via the suction hood 7. In a common housing 17, two suction fan systems 14, are situated at the end of the exhaust exit channel 13.

For practicality in the Venturi-version as according to FIG. 1, the front side air intake hood 3, as well as the exhaust exit channel 13, are arranged below surface. In the exhaust tube 5, underpressure is created, because of the constriction 6, in the exhaust conduit 2, in accordance with the Venturi-principal, by means of which through the suction hood 7, the hollow cavity 18, in the fender 4, is suctioned. As a result of the perforated design of the inner wall 15, of the hollow cavity 18, a suction vacuum is created in the wheel space 10, of the fender 4, by means of which the there existing water droplets will be suctioned out with the air in the wheel space 10. The syphoned off water can then again be expelled in the rear section of the vehicle, through the open end of the air exhaust channel 13. However, it could also be collected in a different area of the vehicle and emptied out from there, via a water divertor (not shown) connected to the air exhaust exit channel 13.

I claim:

1. An apparatus for suppression of spray-mist escaping from the wheel area of vehicles having laterally spaced wheels comprising an exhaust suction apparatus located on each side of the vehicle, each suction apparatus including a fender surrounding a respective one of the laterally spaced wheels, said fender having a circumferential upper portion and a suction hood formed on an inner portion of the fender, an inner wall located within said fender and laterally spaced from said suction hood, said inner wall having a plurality of suction intake openings extending therethrough, a suction tube connected at one end to an outlet formed in said suction hood and connected at an opposite end to an exhaust conduit, said exhaust conduit having an exhaust outlet located at a rear end of the vehicle, and means for creating a suction force in said suction tube for directing spray-mist from the fender to the exhaust outlet.

2. An apparatus in accordance with claim 1, wherein the exhaust apparatus contains a suction fan system.

3. An apparatus in accordance with claim 1, wherein the exhaust conduit includes an air intake hood opening towards the front side of the vehicle, the exhaust conduit having a constriction at the location where the exhaust conduit is connected with the suction tube.

4. An apparatus in accordance with claim 1, wherein additional exhaust suction openings are provided in the circumferential portion of the fender.

5. An apparatus in accordance with claim 4, wherein in the circumferential portion of the fender, perforations are provided as intake suction openings, leading to the suction hood, which is attached to an outer side of the circumferential part of the fender and connected to the exhaust suction tube.

6. An apparatus in accordance with claim 4, wherein the circumferential portion of the fender is a hollow member with a cross-section of approximately the width of the fender and a height smaller than the width, which on one side is connected to the exhaust suction tube and has openings facing the wheel space of the fender on the other side.

* * * * *